United States Patent
Kilkenny et al.

(10) Patent No.: US 6,948,482 B2
(45) Date of Patent: Sep. 27, 2005

(54) ENGINE CYLINDER TEMPERATURE CONTROL

(75) Inventors: Jonathan Patrick Kilkenny, Peoria, IL (US); Kevin Patrick Duffy, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/731,717

(22) Filed: Dec. 9, 2003

(65) Prior Publication Data

US 2005/0121008 A1 Jun. 9, 2005

(51) Int. Cl.$^7$ .......................... F02M 25/07; F02B 33/44
(52) U.S. Cl. ........................ 123/568.14; 123/90.15; 60/602; 60/605.2
(58) Field of Search ............... 123/58.8, 90.15, 123/90.16, 90.17, 90.18, 568.14, 321, 322, 123/323; 60/602, 605.2, 606

(56) References Cited

U.S. PATENT DOCUMENTS

| | | | |
|---|---|---|---|
| 4,075,990 A * | 2/1978 | Ribeton | 123/568.14 |
| 4,561,253 A * | 12/1985 | Curtil | 123/568.14 |
| 4,722,315 A * | 2/1988 | Pickel | 123/568.14 |
| 5,601,068 A | 2/1997 | Nozaki | |
| 5,845,613 A | 12/1998 | Yoshikawa | |
| 6,170,474 B1 * | 1/2001 | Israel | 123/568.14 |
| 6,192,858 B1 * | 2/2001 | Nieberding | 123/568.14 |
| 6,209,530 B1 | 4/2001 | Faletti et al. | |
| 6,272,859 B1 | 8/2001 | Barnes et al. | |
| 6,273,076 B1 | 8/2001 | Beck et al. | |
| 6,321,731 B1 * | 11/2001 | Russ et al. | 123/568.14 |
| 6,354,268 B1 | 3/2002 | Beck et al. | |
| 6,439,210 B1 * | 8/2002 | Faletti et al. | 123/568.14 |
| 6,467,270 B2 | 10/2002 | Mulloy et al. | |
| 6,474,323 B1 | 11/2002 | Beck et al. | |
| 6,571,765 B2 | 6/2003 | Kuboshima et al. | |
| 6,772,742 B2 * | 8/2004 | Lei et al. | 123/568.14 |
| 2002/0002969 A1 | 1/2002 | Adler et al. | |
| 2002/0185109 A1 | 12/2002 | Flynn et al. | |
| 2002/0195086 A1 | 12/2002 | Beck et al. | |
| 2003/0005898 A1 | 1/2003 | Gianolio et al. | |
| 2003/0116124 A1 | 6/2003 | Lawrence et al. | |

* cited by examiner

Primary Examiner—Willis R. Wolfe, Jr.
(74) Attorney, Agent, or Firm—Finnegan, Henderson, Farabow, Garrett & Dunner

(57) ABSTRACT

A method and apparatus for controlling a temperature in a combustion cylinder in an internal combustion engine. The cylinder is fluidly connected to an intake manifold and an exhaust manifold. The method and apparatus includes increasing a back pressure associated with the exhaust manifold to a level sufficient to maintain a desired quantity of residual exhaust gas in the cylinder, and varying operation of an intake valve located between the intake manifold and the cylinder to an open duration sufficient to maintain a desired quantity of fresh air from the intake manifold to the cylinder, wherein controlling the quantities of residual exhaust gas and fresh air are performed to maintain the temperature in the cylinder at a desired level.

14 Claims, 4 Drawing Sheets

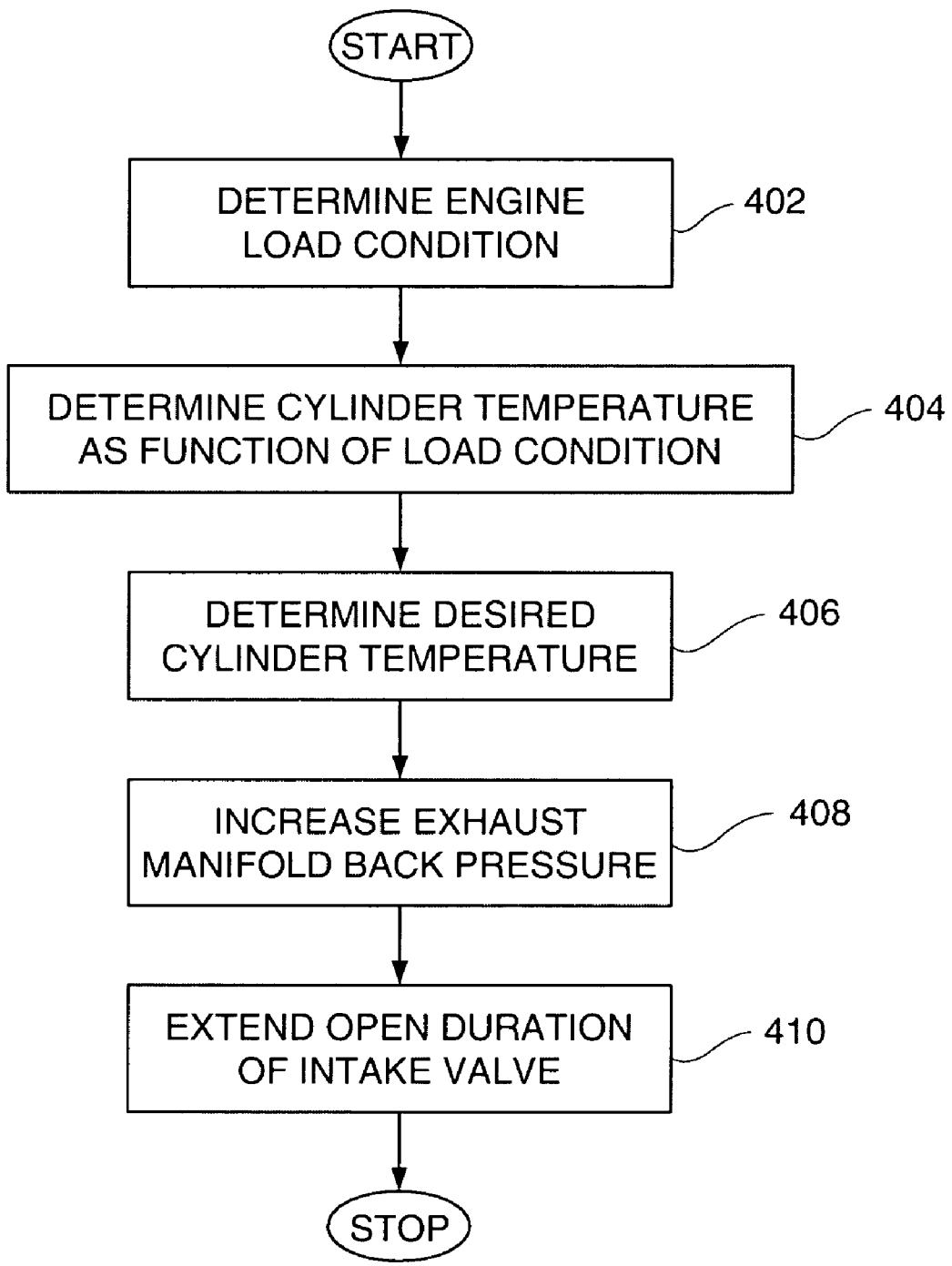

ENGINE CYLINDER TEMPERATURE CONTROL

GOVERNMENT RIGHTS

This invention was made with Government support under DE-FC05-00OR22806 awarded by the Department of Energy. The Government has certain rights in this invention.

TECHNICAL FIELD

This invention relates generally to a method and apparatus for controlling a temperature in a cylinder in an internal combustion engine and, more particularly, to a method and apparatus for controlling levels of internal exhaust residual and fresh air in a cylinder to control the temperature in the cylinder.

BACKGROUND

Internal combustion engines often experience different problems associated with varying operating conditions. For example, compression ignition engines, in particular those operating in homogeneous charge compression ignition (HCCI) mode, tend to be susceptible to incomplete combustion at low loads due to low in-cylinder temperatures. It is thus often desired to increase in-cylinder temperatures under these operating conditions by, for example, adding a quantity of internal exhaust residual into the cylinders.

The methods employed to add internal exhaust residual often create additional problems, however. For example, it is common to modify exhaust cams to change the duration in which exhaust valves remain open. This technique may be successful in providing internal exhaust residual at low loads, but it also may be detrimental to the engine during high load operation. Another possible method is to use an engine turbocharger to increase engine back pressure at low loads. For example, a variable geometry turbine (VGT) may be used. The use of a VGT for this purpose, however, also results in additional airflow being created, which in turn reduces the effect of any additional internal exhaust residual.

The present invention is directed to overcoming one or more of the problems as set forth above.

SUMMARY OF THE INVENTION

In one aspect of the present invention a method for controlling a temperature in a combustion cylinder in an internal combustion engine is disclosed. The cylinder is fluidly connected to an intake manifold and an exhaust manifold. The method includes the steps of increasing a back pressure associated with the exhaust manifold to a level sufficient to maintain a desired quantity of residual exhaust gas in the cylinder, and varying operation of an intake valve located between the intake manifold and the cylinder to an open duration sufficient to maintain a desired quantity of fresh air from the intake manifold to the cylinder, wherein controlling the quantities of residual exhaust gas and fresh air are performed to maintain the temperature in the cylinder at a desired level.

In another aspect of the present invention a method for controlling a temperature in a cylinder of an internal combustion engine is disclosed. The method includes the steps of determining a load condition of the engine, determining a cylinder temperature as a function of the load condition, determining a desired cylinder temperature, increasing a back pressure associated with an exhaust manifold located on the engine and fluidly connected to the cylinder to a level sufficient to maintain a desired quantity of residual exhaust gas in the cylinder, and extending an open duration of an intake valve located between the cylinder and an intake manifold fluidly connected to the cylinder to a duration sufficient to maintain a quantity of fresh air from the intake manifold to a level below a desired threshold, wherein the increased back pressure and extended open duration of the intake valve are controlled to maintain the desired cylinder temperature.

In yet another aspect of the present invention an apparatus for controlling a temperature in a combustion cylinder in an internal combustion engine is disclosed. The apparatus includes an intake manifold fluidly connected to the cylinder, an intake valve located between the intake manifold and the cylinder, an exhaust manifold fluidly connected to the cylinder, means for increasing a back pressure associated with the exhaust manifold to a level sufficient to maintain a desired quantity of residual exhaust gas in the cylinder, and means for varying operation of the intake valve to an open duration sufficient to maintain a desired quantity of fresh air from the intake manifold to the cylinder, wherein controlling the quantities of residual exhaust gas and fresh air are performed to maintain the temperature in the cylinder at a desired level.

In still another aspect of the present invention an apparatus for controlling a temperature in a combustion cylinder in an internal combustion engine is disclosed. The apparatus includes an intake manifold fluidly connected to the cylinder, an intake valve located between the intake manifold and the cylinder, an exhaust manifold fluidly connected to the cylinder, a turbocharger system connected between the intake and exhaust manifolds, a variable intake valve system controllably connected to the intake valve, and a controller electrically connected to the turbocharger and variable intake valve systems for controlling the turbocharger system to increase a back pressure associated with the exhaust manifold, and for controlling the variable intake valve system to vary an open duration of the intake valve, wherein the back pressure and the open duration of the intake valve are controlled to respectively maintain a desired increased quantity of residual exhaust gas and a desired decreased quantity of fresh air in the cylinder, such that the temperature in the cylinder is maintained at a desired level.

BRIEF DESCRIPTION OF THE DRAWINGS

FIG. 4 is a flow diagram illustrating a preferred method of the present invention.

DETAILED DESCRIPTION

Figure 1:
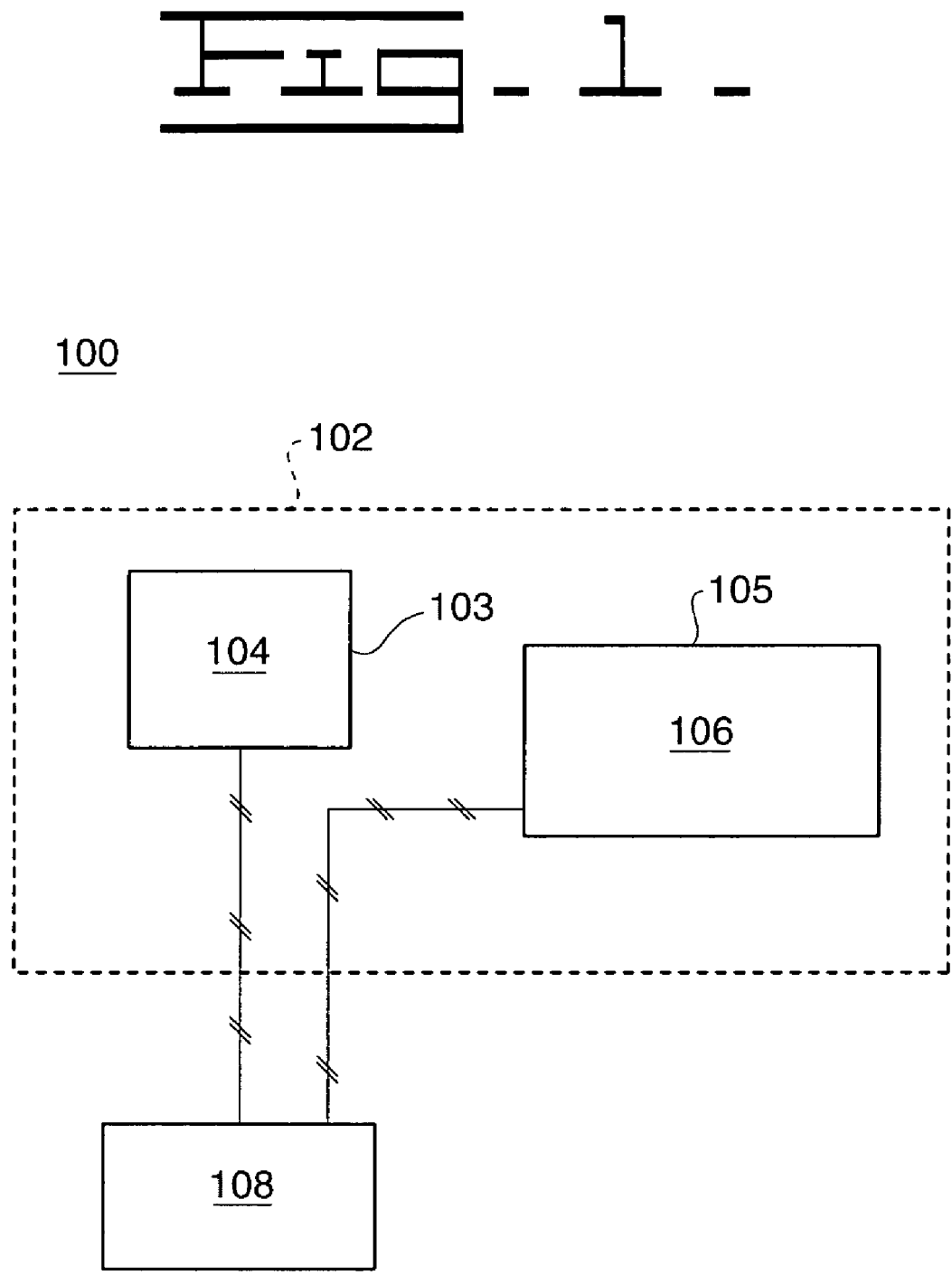
FIG. 1 is a block diagram illustrating a preferred embodiment of the present invention.

Referring to the drawings, a method and apparatus 100 for controlling a temperature in a combustion cylinder 202 (hereinafter referred to as a cylinder 202) in an internal combustion engine 102 is shown.

Referring particularly to FIG. 1, a block diagram illustrating principle components suited for use with the present invention are shown. An engine 102 may be of a compression ignition type, for example a compression ignition diesel engine. However, other types of engines, for example a spark ignition engine such as a gasoline engine may also be used. The present invention finds particular use with homogeneous charge compression ignition engines, commonly referred to as HCCI engines. In particular, the present invention may be suited for use in an HCCI engine under conditions such as low load, in which a temperature in the cylinder 202 may be lower than desired.

A means 103 for varying operation of an intake valve 226 may be found on the engine 102. The means 103 may be a variable intake valve system 104, described in more detail below with respect to FIG. 2.

A means 105 for increasing a back pressure may also be found on the engine 102. The means 105 may be a turbocharger system 106, described in more detail below with respect to FIG. 3.

Back pressure, as is well known in the art, is the resultant pressure acting on an exhaust system of an engine from the creation of a pressure, i.e., a boost pressure, intended for an intake system of the engine. Back pressure may impede the flow of exhaust gas from the cylinder of the engine.

A controller 108 may be electrically connected to the variable intake valve system 104 and the turbocharger system 106 for control in accord with the present invention, as is described in more detail below. The controller 108 may be microprocessor-based and may be either dedicated to the purpose herein described or may be used for additional purposes, such as engine control, diagnostics, and the like.

Figure 2:
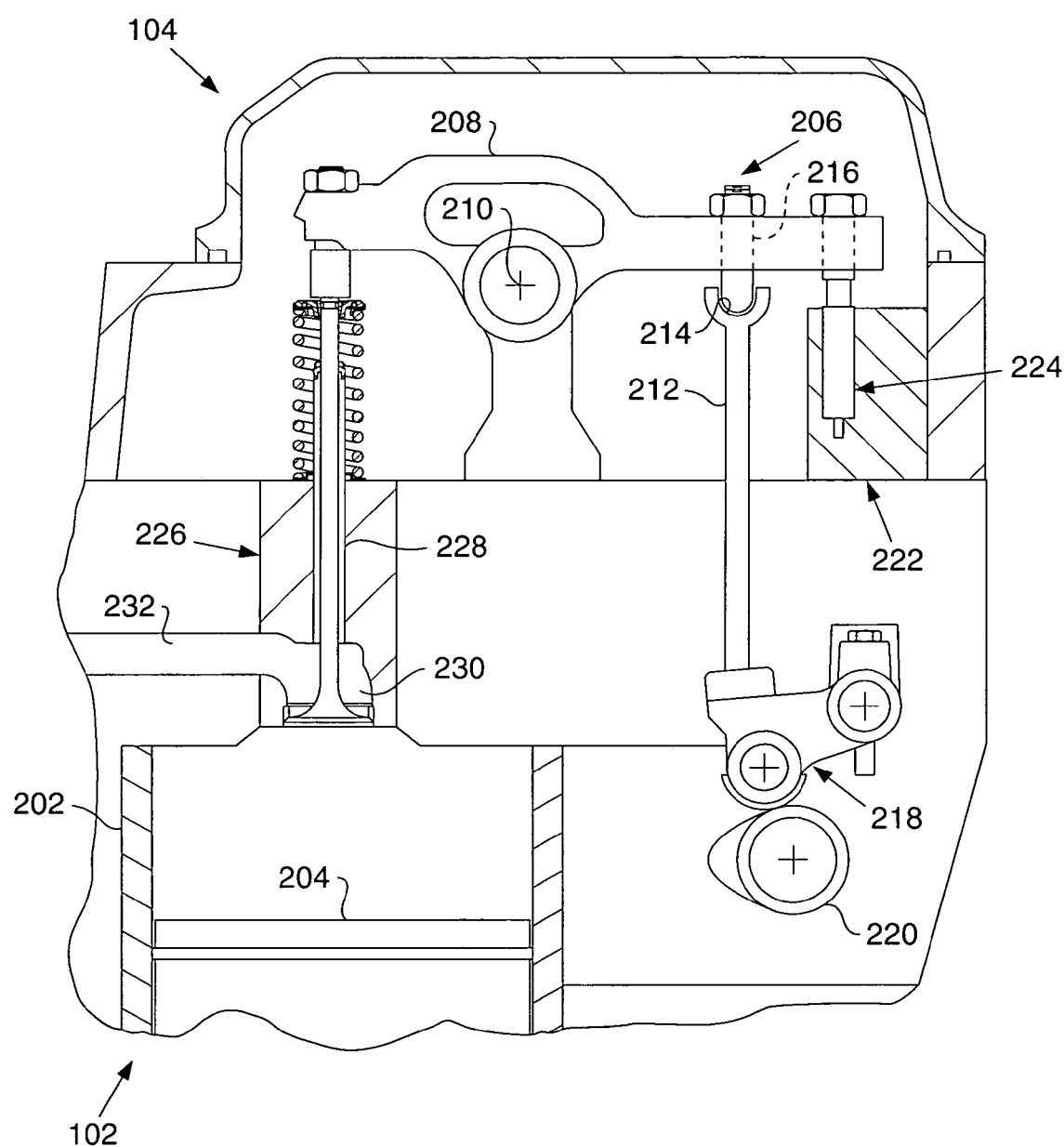
FIG. 2 is a diagrammatic illustration of a variable valve system suited for use with the present invention.

Referring to FIG. 2, a variable intake valve system 104 suited for use with the present invention is shown in detail. Cylinder 202 includes a piston 204 therein, configured to move within the cylinder 202 as is well understood in the art.

A rocker arm assembly 206 includes a rocker arm 208 located to move about a pivot 210. A push rod 212 provides a mechanical force against the rocker arm 208 and may include a cup 214 at one end. A lash adjustment screw 216 mounted to the rocker arm 208 may, in cooperation with the cup 214, provide an adjustable coupling between the push rod 212 and the rocker arm 208.

The push rod 212 may be driven by a lifter assembly 218, which in turn may be driven by a cam 220.

An electro-hydraulic assist actuator 222 may include a plunger assembly 224 for providing a hydraulic force used to vary the open duration of an intake valve 226. More particularly, the rocker arm assembly 206, as enabled by the cam 220, may be used to open the intake valve 226 and the electro-hydraulic assist actuator 222 may be used to hold the intake valve 226 open for a period of time longer than the cam 220 is designed to do.

The intake valve 226 includes a valve member 228 controllably movable to provide a fluid opening from an intake manifold 232 to the cylinder 202 by way of an intake passage 230.

It is noted that the above description of a variable intake valve system 104 is indicative of a hydraulically enhanced mechanical valve system. Other types of valve systems may be used as well, such as fully hydraulic valve control systems, electric valve control systems, and mechanical valve control systems having some type of technique for mechanically varying the open duration of the intake valve 226.

Figure 3:
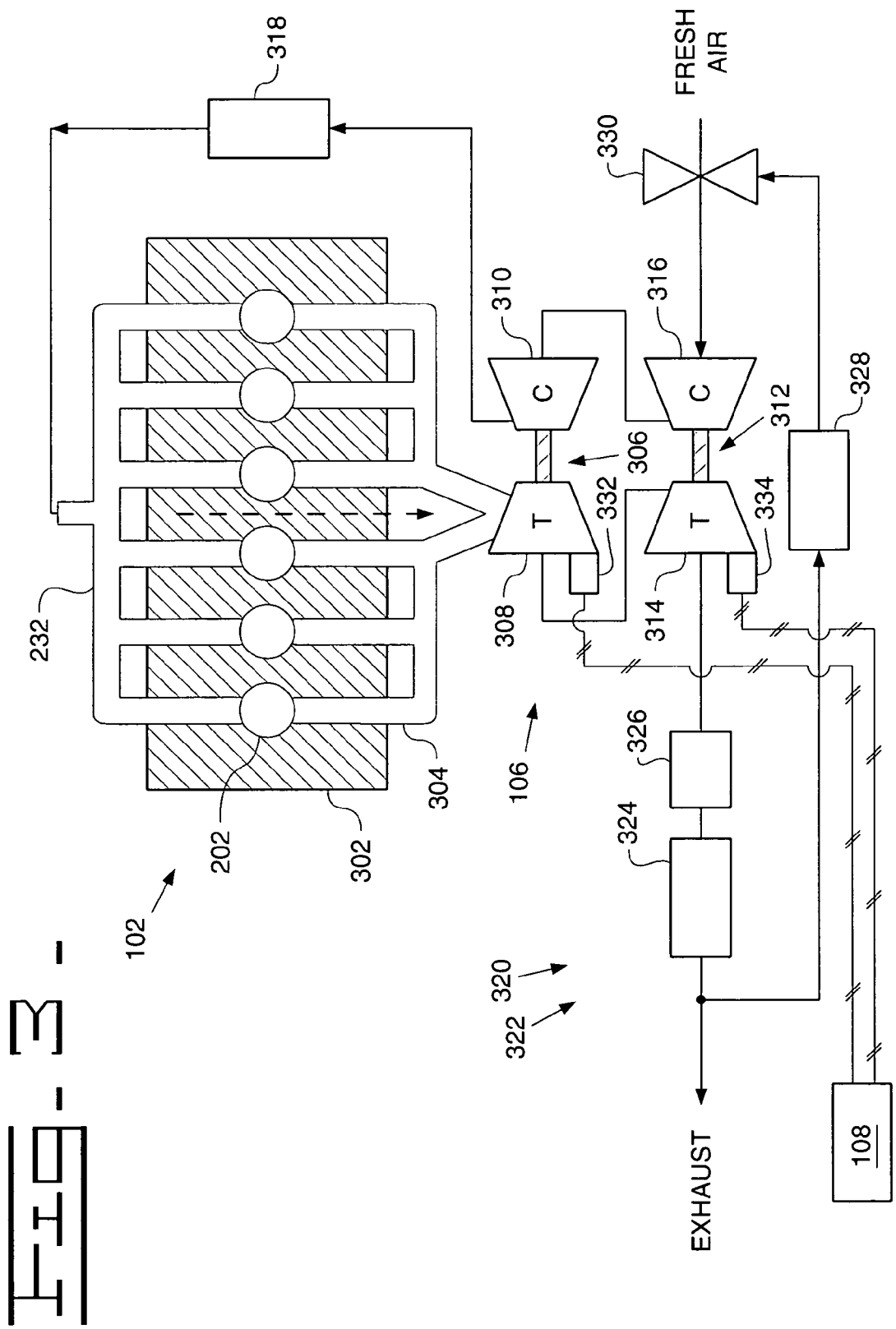
FIG. 3 is a diagrammatic illustration of an engine having a turbocharger system suited for use with the present invention.

Referring to FIG. 3, a diagrammatic illustration of an exemplary turbocharger system 106 as it may be configured with an engine 102 is shown.

The engine 102 includes an engine block 302, which houses at least one cylinder 202, for example six cylinders 202 as shown. It is noted that any number of cylinders may be used, such as four, six, eight, ten, twelve, or any other number. Hereinafter, reference to a cylinder 202 refers to one or more cylinders 202.

An exhaust manifold 304, located on the engine 102, is configured to receive exhaust gas from the cylinder 202 during normal engine operation. The exhaust gas is delivered to the turbocharger system 106 which, in the embodiment shown, includes a first turbocharger 306 having a first turbine 308 and a first compressor 310, followed by a second turbocharger 312 having a second turbine 314 and a second compressor 316.

In operation, the exhaust gas passes through and drives the first turbine 308, then the second turbine 314, which in turn drive, respectively, the first compressor 310 and the second compressor 316. Compressed air from the first and second compressors 310,316 is then delivered to the intake manifold 232, e.g., through an air cooler 318, for controlled delivery to the cylinder 202. After passing through the turbocharger system 106, the exhaust gas may then be delivered to an exhaust system 320.

The exhaust system 320 may include an exhaust gas recirculation (EGR) system 322, which in turn may include a particulate matter (PM) filter 324 and an oxidation catalyst 326 in a downstream path, and an EGR cooler 328 and an EGR valve 330 in a return path. The EGR valve 330 may be configured to controllably introduce a quantity of exhaust gas with the fresh air being supplied to the first and second compressors 310,316.

Preferably, at least one turbocharger 306,312 is configured as a variable geometry turbocharger, i.e., having a variable geometry turbine (VGT). For example, each of the first and second turbines 308,314 may be variable geometry turbines. As such, each turbine 308, 314 would be controlled by VGT vane actuators 332,334, as is well known in the art. The controller 308 would be electrically connected to the VGT vane actuators 332,334 to control each VGT 308,314 in accord with the present invention. For example, to increase back pressure, the VGT vane actuators 332,334 may be actuated to close the vanes of the turbines 308,314.

Other configurations of the turbocharger system 106 may be used as well. For example, two VGTs may be connected in series as shown in FIG. 3, or may be connected in parallel. Alternatively, the turbocharger system 106 may have one large VGT and one back pressure valve (not shown), or one VGT large enough to provide the needed back pressure for the present invention.

INDUSTRIAL APPLICABILITY

Referring to FIG. 4, a flow diagram illustrating a preferred method of the present invention is shown.

In a first control block 402, a load condition of the engine 102 may be determined. For example, it may be determined that the engine 102 is in a low load condition. The load condition may be determined in a number of ways, for example as a function of engine speed, fuel demand, torque, and the like. In a particular example, a low load condition may be an indication that the engine 102 is operating such that the temperature in the cylinder 202 is lower than desired, thus resulting in increased emissions. This may be a particular problem with HCCI mode engines.

In a second control block 404, the engine cylinder temperature may be determined as a function of the load condition. The temperature may be determined as an absolute value or as a trigger that low load correlates with low temperature. Determination of the cylinder temperature may be based on reference to a load-temperature map or may be derived.

As an alternative to first and second control blocks 402, 404, the temperature in the cylinder may be monitored directly, either by sensed means or derived from other factors. Thus, a low temperature determination may be used to trigger use of the present invention, rather that a low load determination.

In a third control block 406, a desired cylinder temperature may be determined. The desired temperature may either be an absolute value or a desired minimum temperature threshold. Other factors, such as the operating state of the engine 102, may be considered as well.

Determination that the cylinder temperature has fallen below the desired value or threshold may then trigger actuation of fourth and fifth control blocks 408, 410.

In the fourth control block 408, the back pressure at the exhaust manifold 304 is increased, preferably by actuating at least one VGT 308, 314. More specifically, at least one VGT 308, 314 is actuated by closing the vanes of the turbine 308, 314 to increase boost pressure at the intake manifold 232 and subsequently increase back pressure at the exhaust manifold 304. The increased back pressure has the effect of preventing a quantity of exhaust gas from exiting the cylinder 202, which in turn increases the temperature in the cylinder 202.

Unfortunately, the increased boost pressure at the intake manifold 232 also has the effect of forcing more fresh air into the cylinder 202, which tends to decrease the temperature. In the fifth control block 410, however, the open duration of the intake valve 226 is extended, for example up to about one half of the compression stroke, to allow the compression within the cylinder 202 to prevent some of the excess fresh air from entering and perhaps even pushing a quantity of the fresh air back out of the cylinder 202 into the intake manifold 232. Thus, the excess fresh air from the increased boost pressure is not allowed into the cylinder 202, and the temperature remains increased due to the residual exhaust gas.

Other aspects can be obtained from a study of the drawings, the disclosure, and the appended claims.

What is claimed is:

1. A method for controlling a temperature in a combustion cylinder in an internal combustion engine, the cylinder being fluidly connected to an intake manifold and an exhaust manifold, comprising the steps of:
   increasing a back pressure associated with the exhaust manifold to a level sufficient to maintain a desired quantity of residual exhaust gas in the cylinder; and
   varying operation of an intake valve located between the intake manifold and the cylinder to an open duration sufficient to maintain a desired quantity of fresh air from the intake manifold to the cylinder;
   wherein controlling the quantities of residual exhaust gas and fresh air are performed to maintain the temperature in the cylinder at a desired level.

2. A method, as set forth in claim 1, wherein controlling the quantities of residual exhaust gas and fresh air are performed to increase the temperature in the cylinder to a desired level.

3. A method, as set forth in claim 2, wherein controlling the quantities of residual exhaust gas and fresh air are performed during low load operation of the engine.

4. A method, as set forth in claim 1, wherein varying operation of an intake valve includes the step of extending the open duration of the intake valve beyond a normal open duration.

5. A method, as set forth in claim 4, wherein extending an open duration of the intake valve includes the step of extending an open duration of the intake valve for a period sufficient to maintain a quantity of fresh air below a desired level.

6. A method, as set forth in claim 5, wherein extending an open duration of the intake valve includes the step of extending an open duration of the intake valve for a period sufficient to decrease a quantity of fresh air in the cylinder.

7. A method, as set forth in claim 1, wherein increasing a back pressure includes the step of controllably actuating at least one variable geometry turbine in a turbocharger system associated with the intake and exhaust manifolds.

8. A method for controlling a temperature in a cylinder of an internal combustion engine, comprising the steps of:
   determining a load condition of the engine;
   determining a cylinder temperature as a function of the load condition;
   determining a desired cylinder temperature;
   increasing a back pressure associated with an exhaust manifold located on the engine and fluidly connected to the cylinder to a level sufficient to maintain a desired quantity of residual exhaust gas in the cylinder; and
   extending an open duration of an intake valve located between the cylinder and an intake manifold fluidly connected to the cylinder to a duration sufficient to maintain a quantity of fresh air from the intake manifold to a level below a desired threshold;
   wherein the increased back pressure and extended open duration of the intake valve are controlled to maintain the desired cylinder temperature.

9. An apparatus for controlling a temperature in a combustion cylinder in an internal combustion engine, comprising:
   an intake manifold fluidly connected to the cylinder;
   an intake valve located between the intake manifold and the cylinder;
   an exhaust manifold fluidly connected to the cylinder;
   means for increasing a back pressure associated with the exhaust manifold to a level sufficient to maintain a desired quantity of residual exhaust gas in the cylinder; and
   means for varying operation of the intake valve to an open duration sufficient to maintain a desired quantity of fresh air from the intake manifold to the cylinder;
   wherein controlling the quantities of residual exhaust gas and fresh air are performed to maintain the temperature in the cylinder at a desired level.

10. An apparatus for controlling a temperature in a combustion cylinder in an internal combustion engine, comprising:
   an intake manifold fluidly connected to the cylinder;
   an intake valve located between the intake manifold and the cylinder;
   an exhaust manifold fluidly connected to the cylinder;
   a turbocharger system connected between the intake and exhaust manifolds;
   a variable intake valve system controllably connected to the intake valve; and a controller electrically connected to the turbocharger and variable intake valve systems for controlling the turbocharger system to increase a back pressure associated with the exhaust manifold, and for controlling the variable intake valve system to vary an open duration of the intake valve, wherein the back pressure and the open duration of the intake valve are controlled to respectively maintain a desired increased quantity of residual exhaust gas and a desired decreased quantity of fresh air in the cylinder, such that the temperature in the cylinder is maintained at a desired level.

11. An apparatus, as set forth in claim 10, wherein the turbocharger system includes at least one variable geometry turbocharger (VGT).

12. An apparatus, as set forth in claim 11, wherein the turbocharger system includes two variable geometry turbochargers.

13. An apparatus, as set forth in claim 11, further including at least one VGT vane actuator connected to a corresponding at least one VGT and electrically connected to the controller.

14. An apparatus, as set forth in claim 10, wherein the variable intake valve system is configured to extend the open duration of the intake valve beyond a normal open duration.

* * * * *